United States Patent [19]

Nakayama et al.

[11] Patent Number: 4,818,236
[45] Date of Patent: Apr. 4, 1989

[54] WIRE HARNESS FOR AUTOMOTIVE VEHICLE

[75] Inventors: Yoshiaki Nakayama; Yasuhiro Miyazawa, both of Shizuoka, Japan

[73] Assignee: Yazaki Corporation, Japan

[21] Appl. No.: 125,531

[22] Filed: Nov. 25, 1987

[51] Int. Cl.$^4$ .......................................... H01R 33/00
[52] U.S. Cl. ..................................... 439/34; 439/115; 439/874
[58] Field of Search ..................... 439/43, 44, 47-54, 439/55, 74, 65, 66, 67, 110, 115, 119, 121, 111, 114, 723, 724, 709, 710, 712, 34, 502, 874; 49/502; 296/146; 307/10 R, 10 A; 174/72 R, 72 A

[56] References Cited

U.S. PATENT DOCUMENTS

| | | | |
|---|---|---|---|
| 2,922,135 | 1/1960 | Hoberg et al. | 439/48 |
| 3,226,802 | 1/1966 | Goodwin, Jr. et al. | 439/50 |
| 3,408,452 | 10/1968 | Ruehlemann | 439/44 |
| 3,699,496 | 10/1972 | Witcher | 439/44 |
| 4,315,662 | 2/1982 | Greenwood et al. | 439/48 |
| 4,595,799 | 6/1986 | Krob et al. | 439/55 |
| 4,711,052 | 12/1987 | Maeda et al. | 49/502 |

FOREIGN PATENT DOCUMENTS

| | | | |
|---|---|---|---|
| 1777275 | 1/1970 | United Kingdom | 174/72 A |
| 2164609 | 3/1986 | United Kingdom | |
| 2166603 | 5/1986 | United Kingdom | |

Primary Examiner—David Pirlot
Attorney, Agent, or Firm—Wigman & Cohen

[57] ABSTRACT

To effectively form a branch harness from a trunk harness, the wire harness comprises an insulating sheet, a plurality of horizontal harness conductors arranged in parallel to each other on the insulating sheet, and a plurality of second harness conductors also arranged in parallel to each other and perpendicular to said first harness conductors on the insulating sheet. The first and second harness conductors are selectively connected to each other through holes formed in another insulating sheet with soldering, welding, rivets or grommets or by cutting off harness conductor ends along a line inclined at 45 degrees with respect to the harness conductor. Further, it is preferable to directly form male or female connector terminals at each end of the harness conductors.

10 Claims, 2 Drawing Sheets

FIG.1
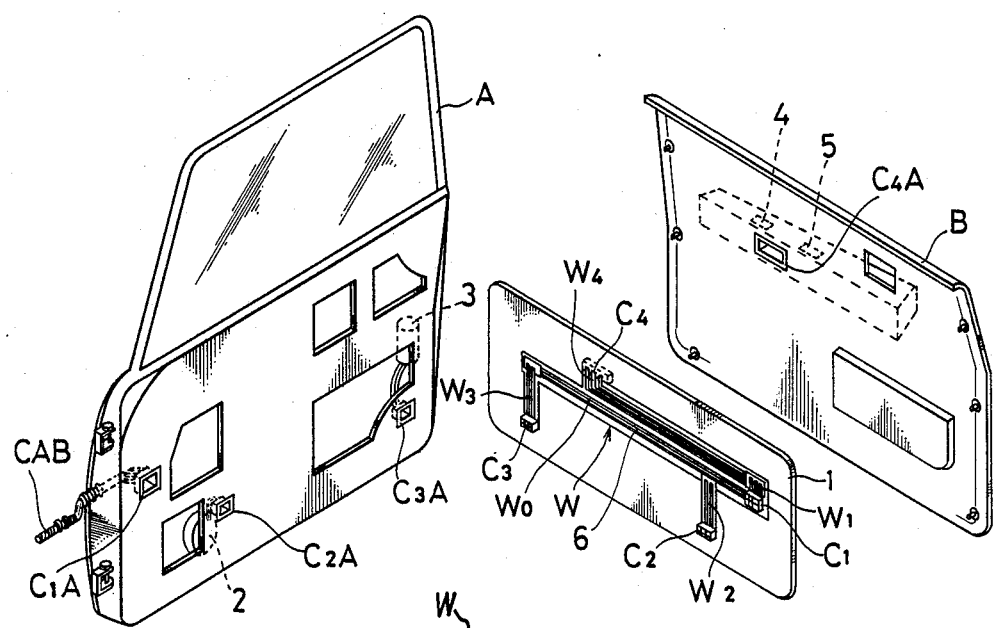
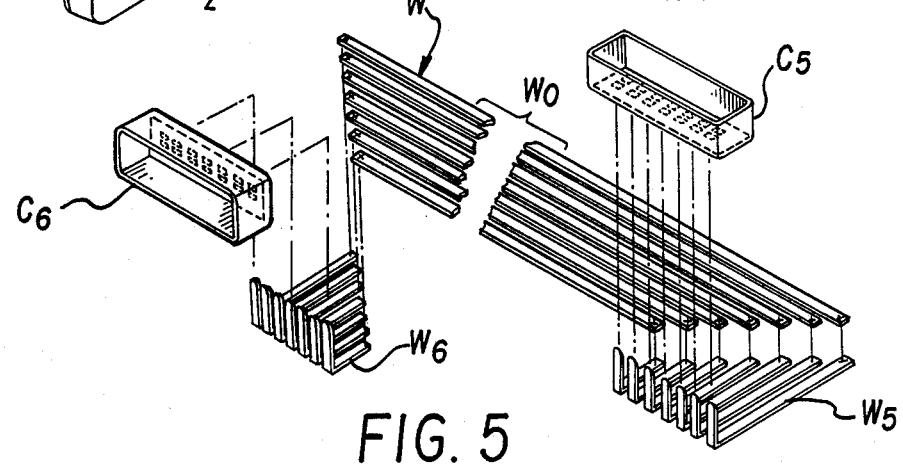
FIG. 5

FIG.2
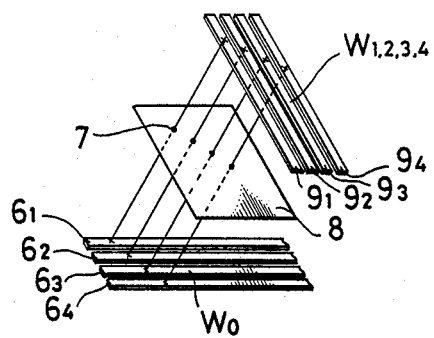
FIG.3
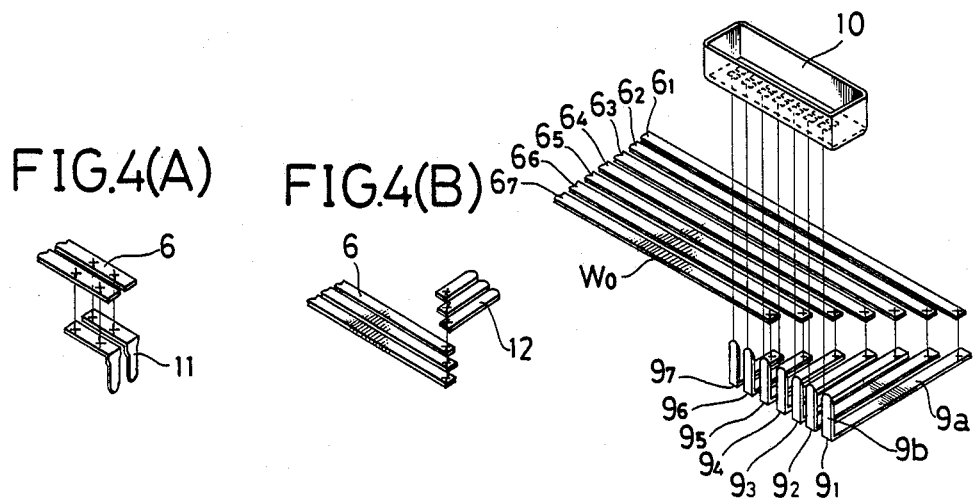
FIG.4(A) FIG.4(B)
FIG.4(C)
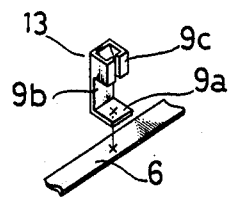

WIRE HARNESS FOR AUTOMOTIVE VEHICLE

BACKGROUND OF THE INVENTION

1. Field of the Invention

The present invention relates to a wire harness for connecting various electric or electronic devices or elements equipped in an automotive vehicle.

2. Description of the Prior Art

Conventionally, a bundled wire cable has widely been used for an automotive vehicle to connect various electric or electronic devices or appliances equipped in the vehicle. The structure of the bundled wire cable is such that a great number of wires or cables are branched from a trunk cable bundled by winding a great number of wires by an insulation tape. The trunk cable is arranged within a space in an automotive vehicle and fixed by appropriate fixtures thereto, and the branch wires are connected to various electric elements via connecters respectively.

In the prior-art bundled wire cable, there has arisen a serious problem in that the diameter of the bundled wire cable increases with increasing number of electric or electronic elements to be equipped in an automotive vehicle and therefore it is impossible to arrange the large-diameter bundled wire cable within a limited small space within an automotive vehicle.

To overcome these problems, there has been proposed a flat light-weight wire harness (flat conductor pattern) in which a plurality of flat parallel conductors are arranged on an insulating sheet, in place of bundled wire cables.

In the conventional wire harness, although the trunk portion of the bundled wire cable has been replaced with the wire harness, since branch wires are still branched off from the trunk harness conductors by soldering covered wire having a terminal connectable to electric elements at one end thereof to each trunk harness conductor, there exists a disadvantage such that it is impossible to reduce the cable space as much as possible in an automotive vehicle.

SUMMARY OF THE INVENTION

With these problems in mind, therefore, it is the primary object of the present invention to provide a wire harness including branch harness conductors for an automotive vehicle.

To achieve the above-mentioned object, a wire harness for an automotive vehicle according to the present invention comprises: (a) an insulating sheet; (b) a plurality of first harness conductors arranged in parallel to each other on the insulating sheet; (c) a plurality of second harness conductors also arranged in parallel to each other and perpendicular to the first harness conductors on the insulating sheet; and (d) each of the second harness conductors being connected to each of the first harness conductors separately to form branch harness conductors.

Each of the first harness conductors is selectively connected to each of the second harness conductors by connecting means through holes formed in another insulating sheet. The connecting means is soldering, welding, rivets or grommets.

Alternatively, each end of the first harness conductors is connected to each end of the second harness conductors by cutting off each end of the first and second harness conductors so that cut-off ends of the conductors are arranged at an inclination angle of 45 degrees with respect to the longitudinal direction of the harness conductor.

Further, it is preferable that the branch harness conductors are provided with connector terminals, respectively so as to be directly connectable with other electric elements. The connector terminals are male or female connector terminals of flat, L-shaped, or square shaped members.

BRIEF DESCRIPTION OF THE DRAWINGS

The features and advantages of the wire harness for an automotive vehicle according to the present invention will be more clearly appreciated from the following description taken in conjunction with the accompanying drawings in which:

FIG. 1 is an entire perspective view showing an embodiment of the wire harness according to the present invention, which is applied to a vehicle door;

FIG. 2 is a perspective view for assistance in explaining a method of connecting branch conductors to intermediate portions of trunk conductors;

FIG. 3 is a perspective view for assistance in explaining another method of connecting branch conductors to end portions of trunk conductors and a connector directly provided for the branch conductors;

FIG. 4(A) is a perspective view showing another modification of male connector terminals fixed to ends of the branch conductors;

FIG. 4(B) is a perspective view showing another modification of male connector terminals fixed to ends of the branch conductors;

FIG. 4(C) is a perspective view showing another modification of a female connector terminal fixed to an intermediate portion of the branch conductor; and FIG. 5 is a perspective view showing the connection of the branch conductors to opposed ends of the trunk conductors and connectors directly provided for the branch conductors.

DETAILED DESCRIPTION OF THE PREFERRED EMBODIMENTS

FIG. 1 shows a wire harness of the present invention applied to a vehicle door. In the drawing, a wire harness W is fixed to an insulating sheet 1 by a bonding agent or a bonding tape, and the insulating sheet 1 is sandwiched between a door frame A and a door cover B.

The wire harness W is composed of a horizontal trunk harness $W_0$ (corresponding to a trunk cable) and a plurality of vertical branch harness $W_1$, $W_2$, $W_3$ and $W_4$. Each of these harnesses is composed of several harness conductors. The three branch harness $W_1$, $W_2$, and $W_3$ are provided with three connectors $C_1$, $C_2$ and $C_3$, respectively, so arranged as to face the door frame A. On the other hand, the branch harness $W_4$ is provided with a connector $C_4$ so arranged as to face the door cover B.

On the inner side of the door frame A, there are arranged a cable connector $C_1A$ (mated with the connector $C_1$) connected to an end of a vehicle cowl side cable CAB, a power window connector $C_2A$ (mated with the connector $C_2$) connected to a power window motor 2, and a door-lock connector $C_3A$ (mated with the connector $C_3$) connected to an autodoor-lock solenoid 3. Here, "cowl" implies the top portion of the front part of an automotive vehicle body forward of the two front doors to which the windowshield and instrument board are attached.

On the inner side of the door cover plate B, there is provided a power window connector $C_4A$ (mated with the connecter $C_4$) connected to a power window switch 4 and a door-lock switch 5.

Therefore, when the insulation sheet 1 is fixed to the door frame A with the two connectors $C_1$ and $C_1A$, $C_2$ and $C_2A$ and $C_3$ and $C_3A$ engaged with each other, respectively and further the door cover B is fixed to the door frame A with two connectors $C_4$ and $C_4A$ engaged with each other, the cowl side cable is connected to the power window motor 2 and the door-lock solenoid 3 via the power window switch 4 and the door lock switch 5, respectively, by way of the wire harness W.

The harness is composed of several flat conductors arranged on an insulating sheet, and the branch harnesses $W_1$, $W_2$, $W_3$ and $W_4$ are branched from the trunk harness $W_0$ as shown in FIGS. 2 and 3.

In the case of FIG. 2, each harness conductor $9_1$ to $9_4$ of each vertical branch harness $W_1$, $W_2$, $W_3$ or $W_4$ is fixed or connected to each harness conductor $6_1$ to $6_4$ of the horizontal trunk harness $W_0$, respectively by soldering, welding, rivets, or grommets through holes 7 formed in another insulating sheet 8. In branching method shown in FIG. 2, the branch harness $W_1$ to $W_4$ can be branched off at any intermediate position of the trunk harness $W_0$ and it is possible to change the number of branch conductors freely.

In the case of FIG. 3, each end of the horizontal and vertical harness conductors is cut off so as to be arranged at an inclination angle of 45 degrees with respect to the longitudinal direction of the horizontal or vertical conductors, so that plural conductors $6_1$ to $6_7$ of the trunk harness $W_0$ can be connected to plural conductors $9_1$ to $9_7$ of the branch harness $W_1$, $W_2$, $W_3$ or $W_4$ in one-to-one correspondence. These two ends of the conductors are connected to each other by soldering, welding, rivets or grommets.

Further, each male connector terminal 9b is formed in each branch conductor 9a by bending each end of the conductor 9a into L shape so as to be fitted to each hole formed in a connector housing 10.

FIGS. 4(A) to (C) show other modifications of forming the connector terminals in the branch conductors 9a. In the case of FIG. 4(A), each L-shaped male connector terminal 11 is fixed to each flat harness conductor 6 in such a way that each terminal 11 is bent perpendicular to the flat harness conductor 6.

In the case of FIG. 4(B), each flat male connector terminal 12 is fixed to each flat harness conductor 6 in such a way that each terminal 11 is flush with the flat harness conductor 6.

In the case of FIG. 4(C), a female connector terminal 13 is fixed to the flat harness conductor 6 perpendicular thereto. The female connector terminal 13 is composed of a base portion 9a, a stay portion 9b and a square contact portion 9c to which each mate male connector terminal is fitted.

The above connector terminals 9, 11, 12 or 13 are directly formed on both sides of the harness conductors 6 as a group of connector terminals. Therefore, electric elements such as connector, solenoid, etc. can be directly connected to the branch harness conductors.

In the above embodiment, a door wire harness has been described. However, without being limited thereto, it is of course possible to apply the wire harness according to the present invention to other sections of an automotive vehicle.

As described above, in the wire harness of the present invention, since any branch harness can be formed being branched off from the trunk harness, on the basis of combination of vertical and horizontal flat conductors, by a simple connecting method, it is possible to automate the manufacturing process of the wire harness.

Further, since a group of connector terminals can be directly connected to any given position of the horizontal and vertical flat harness conductors, it is possible to directly connect various electric or electronic elements such as connectors, relays, etc. on either side of the wire harness, thus eliminating wasteful mounting spaces required for the conventional bundled cable, while making the best use of the wire harness advantages.

What is claimed is:

1. A wire harness for an automotive vehicle, which comprises:
   (a) a plurality of trunk harness conductors arranged in parallel to each other at regular intervals, both ends of each of said trunk harness conductors being cut off so as to be arranged at an angle of 45 degrees or more with respect to a longitudinal direction thereof;
   (b) at least one set of first branch conductors arranged in parallel to each other at regular intervals and perpendicular to said trunk harness conductors, a first end of each of said first branch harness conductors being cut off so as to be arranged at an angle of 45 degrees with respect to a longitudinal direction thereof and connected to an end of each of said trunk harness conductors independently in regular order, and a second end of each of said first branch harness conductors being cut off so as to be arranged perpendicular to the longitudinal direction thereof and formed with a connector terminal directly connectable with an electric element; and
   (c) at least one set of second branch conductors arranged in parallel to each other at regular intervals and perpendicular to said trunk harness conductors, an intermediate portion of each of said second branch conductors being connected independently in regular order to an intermediate portion of each of said trunk harness conductors so that each connected point is arranged on a line extending at an angle of 45 degrees with respect to the longitudinal direction thereof, and a second end of each of said second branch harness conductors being cut off so as to be arranged perpendicular to the longitudinal direction thereof and formed with a connector terminal directly connectable with an electric element.

2. The wire harness as set forth in claim 1, wherein said connecter terminal is a male connecter terminal directly formed by bending an end of said branch harness conductors into an L shape.

3. The wire harness as set forth in claim 1, wherein said connecter terminal is a male connecter terminal formed by fixing an L-shaped member to an end of said branch harness conductor.

4. The wire harness as set forth in claim 1, wherein said connecter terminal is a male connecter terminal formed by fixing a flat member to an end of said branch harness conductor.

5. The wire harness as set forth in claim 1, wherein said connecter terminal is a female connecter terminal formed by fixing a square member to an end of said branch harness conductor.

6. The wire harness as set forth in claim 1, wherein each of said trunk harness conductors is independently connected to each of said branch harness conductors through a hole formed in an insulating sheet intervening between said trunk and said second harness conductors with connecting means.

7. The wire harness as set forth in claim 6, wherein said connecting means is soldering.

8. The wire harness as set forth in claim 6, wherein said connecting means is welding.

9. The wire harness as set forth in claim 6, wherein said connecting means is a rivet.

10. The wire harness as set forth in claim 6, wherein said connecting means is a grommet.

* * * * *